United States Patent [19]

Wallis

[11] Patent Number: 5,088,698
[45] Date of Patent: Feb. 18, 1992

[54] SEALING CONSTRUCTION FOR A GAS SPRING

[76] Inventor: Bernard J. Wallis, 2215 Dacosta, Dearborn, Mich. 48128

[21] Appl. No.: 433,363

[22] Filed: Nov. 8, 1989

[51] Int. Cl.⁵ ............................................. F16F 9/02
[52] U.S. Cl. ................................... 267/119; 267/130
[58] Field of Search ............... 267/64.15, 64.16, 64.28, 267/64.18, 118, 119, 120, 130, 124, 127, 64.11

[56] References Cited

U.S. PATENT DOCUMENTS

| | | | |
|---|---|---|---|
| 4,550,899 | 11/1985 | Holley | 267/119 |
| 4,583,722 | 4/1988 | Wallis | 267/130 X |
| 4,601,461 | 7/1986 | Brough et al. | 267/129 X |
| 4,664,362 | 5/1987 | Hennells | 267/119 |
| 4,741,518 | 5/1988 | Wallis | 267/130 |
| 4,742,997 | 5/1988 | Wallis | 267/119 |
| 4,765,227 | 8/1988 | Balazs et al. | 267/119 X |

*Primary Examiner*—Matthew C. Graham
*Attorney, Agent, or Firm*—Barnes, Kisselle, Raisch, Choate, Whittemore & Hulbert

[57] ABSTRACT

A gas spring comprising a cylindrical body having a base wall and an integral side wall with an open upper end defining a bore. The bore includes a lower cylindrical portion and an upper cylindrical portion of greater diameter than the lower cylindrical portion defining a shoulder. A piston of constant diameter is positioned in the bore and has a radial flange on its lower end with a wear bearing contacting the lower portion of the bore. An annular retainer is positioned on the shoulder and is adapted to be engaged by the flange on the piston. An annular end cap is threaded in the upper cylindrical portion of the bore and maintains the retainer against the shoulder. An annular lock nut is threaded in the upper portion of the bore and locks the end caps in position. Circumferentially spaced radial openings are provided adjacent the periphery of the lock nut for venting gas during disassembly if any gas remains. A charging valve and a rupture plug including pressure relief disc are provided in the base wall.

8 Claims, 2 Drawing Sheets

SEALING CONSTRUCTION FOR A GAS SPRING

BACKGROUND AND SUMMARY OF THE INVENTION

In presses and dies, it has been common to utilize coil metal springs that fit in cylindrical pockets in a die in order to absorb the force of various operations such as metal stamping operations. It has also been common to design rams such that they incorporate gas springs which are either associated with a manifold or self contained.

Among the objectives of the present invention are to provide an improved gas spring which effectively and efficiently provides the desired absorbing force; which includes provision for relief of excess pressure; which includes provision for relief of pressure during assembly; and which can be readily adapted for use as a self-contained spring or in series with other gas springs or in a manifold or reservoir tank.

In accordance with the invention, the self-contained gas spring comprises a cylindrical body having a base wall and an integral side wall with an open upper end defining a bore. The bore includes a lower cylindrical portion and an upper cylindrical portion of greater diameter than the lower cylindrical portion defining a shoulder. A piston of constant diameter is positioned in the bore and has a radial flange on its lower end with a wear bearing contacting the lower portion of the bore. An annular retainer is positioned on the shoulder and is adapted to be engaged by the flange on the piston. An annular end cap is threaded in the upper cylindrical portion of the bore and maintains the retainer against the shoulder. An annular lock nut is threaded in the upper portion of the bore and locks the end cap in position. Circumferential spaced radial openings are provided adjacent the periphery of the lock nut for venting gas during disassembly if any gas remains. A charging valve and a rupture plug including a pressure relief disc are provided in the base wall.

DESCRIPTION

Figure 1:
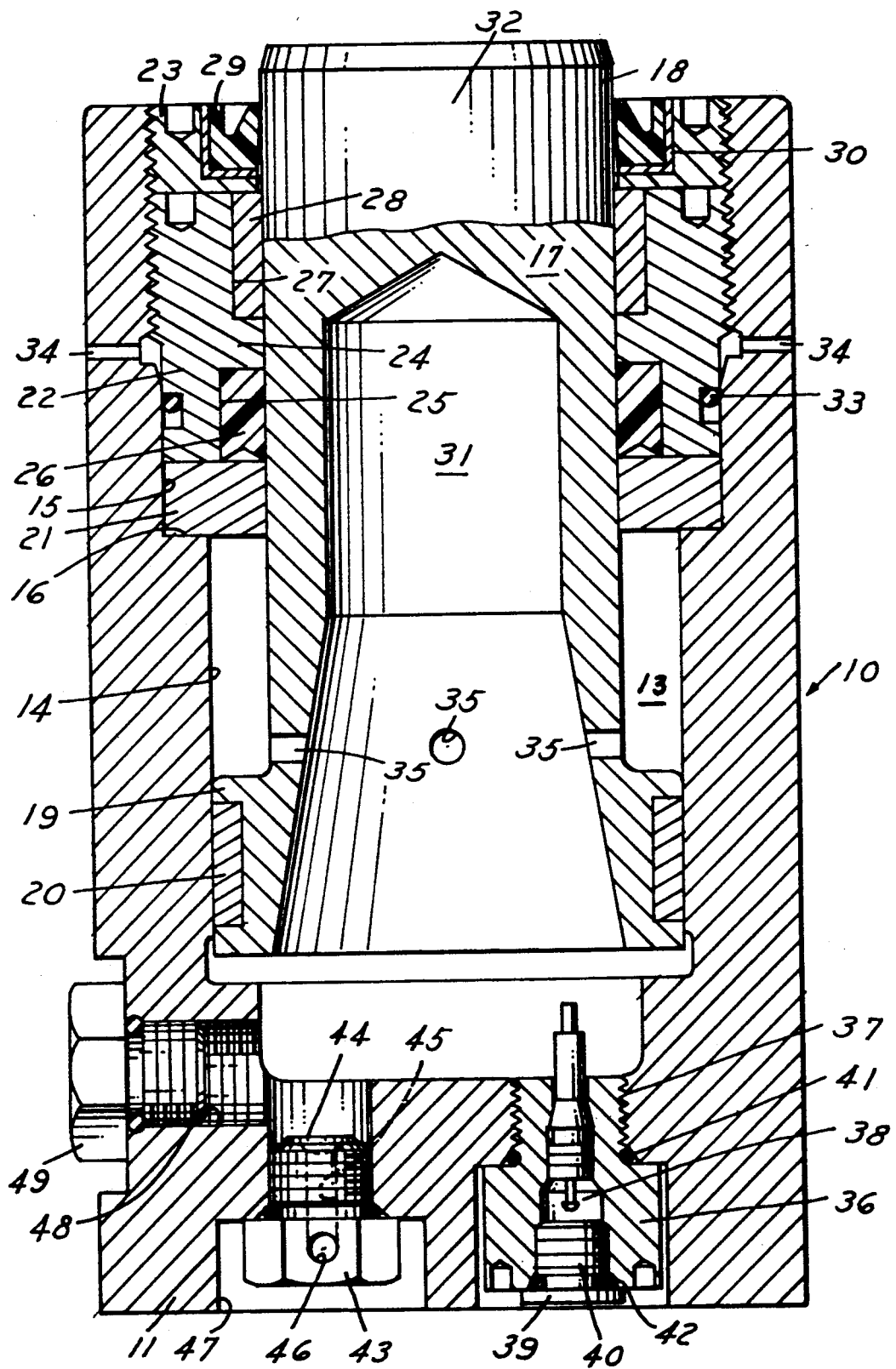
FIG. 1 is a sectional view of a self-contained gas spring embodying the invention.

Referring to FIG. 1, the self-contained gas spring embodying the invention comprises a cylindrical body 10 having a closed base wall 11 and an integral side wall 12 defining a bore 13. The bore 13 includes a lower cylindrical portion 14 and an upper cylindrical portion 15 of greater diameter than the lower cylindrical portion 14 defining a shoulder 16. A piston 17 comprises a rod 18 of constant diameter and is positioned in the bore and has a radial flange 19 with a wear bearing 20 engaging the lower portion of the bore 14. An annular retainer 21 engages shoulder 16 and is maintained in position on the shoulder 16 by an annular end cap 22 which has external threads engaging internal threads in the upper bore portion 15. An annular lock nut 23 has external threads engaging the internal threads on the upper bore portion 15 to hold the lock nut and in turn, the retainer 21 against shoulder 16.

Retainer 21 includes a radially inwardly extending flange 24 defining an inwardly facing groove 25 on its lower end for receiving a cup seal 26 engaging the upper surface of the retainer 21. The flange 24 also defines an upper groove 27 for receiving an upper wear bearing 28 in the groove 27 between the flange 24 and the lock nut.

The lock nut 23 includes an upper groove for receiving a U-shaped wiper seal 29 that preferably includes a metal cap 30 that extends along its outer surface and lower surface. The wiper 29 functions to prevent contaminants from entering the space surrounding the rod portion 18 of the piston 17.

As shown, the major portion of the piston is open as at 31 except for the closed upper portion 32.

A seal in the form of an O-ring 33 is provided in a groove adjacent the unthreaded end of the periphery of the end cap 22. Radial openings 34 extend from the periphery of the end cap 22 to provide for venting as a safety measure to prevent any tendency that there might be to cause unthreading of the end cap 22 by the gas pressure of gas remaining in the cylinder during disassembly when the lock nut 23 is loosened or removed during maintenance.

The interior 31 of the piston communicates with the exterior of the piston rod through radial openings 35.

The gas spring further includes an adapter 36 threaded as at 37 into a shouldered opening in the base 11 that in turn is adapted to receive a one-way valve preferably in the form of a Schrader fitting 38 for charging the cylinder and an end plug 39 threaded as at 40 for closing the openings. O-ring seals 41, 42 are provided respectively for the adaptor 36 and the end plug 39.

Further, a rupture plug 43 is threaded into a stepped opening 47 that extends axially in the base wall 11 and includes a thin metal rupture disc 44 soldered at the upper end of an opening 45 which will rupture if the pressure becomes excessive at a predetermined pressure permitting venting through the opening 45 and the radial opening 46, the latter being directed against the enlarged portion 47 so that any particles and the like will be deflected rather than passing axially outwardly. A second plug 49 similar to the plug 39 is provided in a radial opening 48 by threading.

Figure 2:
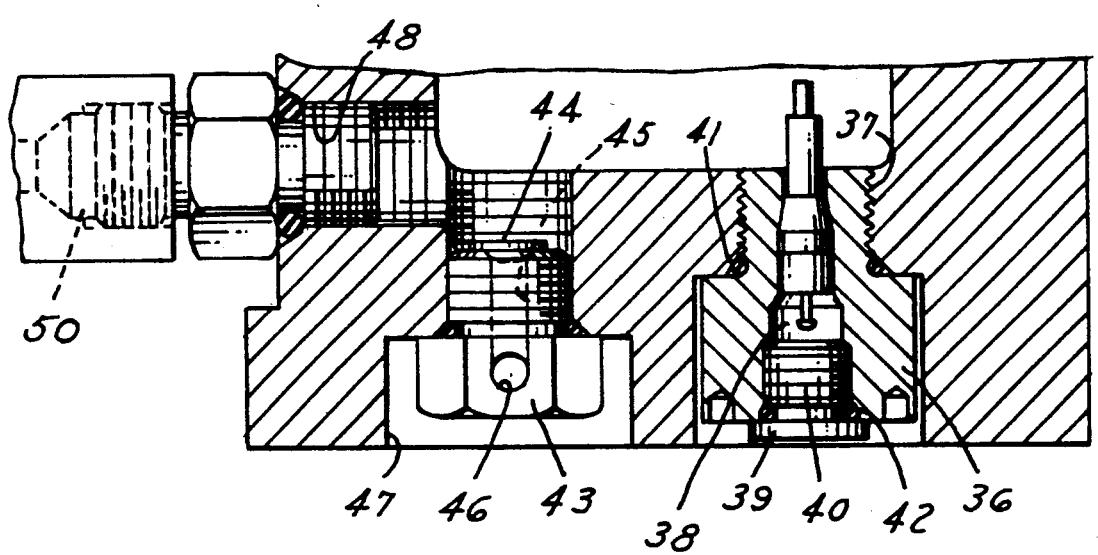
FIG. 2 is a fragmentary sectional view of a modified form of gas spring.

In the modified form shown in FIG. 2, the plug 39 is replaced with a fitting 50 so that the gas spring is converted from a self-contained gas spring to a gas spring that can be used in series or in a manifold with other gas springs.

In operation, the spring is charged to a predetermined pressure and functions, in a well known manner, to absorb the forces in a press or the like within which it is associated.

It can thus be seen that there has been provided a gas spring which effectively and efficiently provides the desired absorbing force; which includes provision for relief of excess pressure; which includes provision for relief of pressure in case of failure of seals; and which can be readily adapted for use as a self-contained spring or in series or in a manifold with either gas springs.

I claim:

1. A gas spring comprising
a cylindrical body having a base wall and an integral side wall defining a bore,
said bore including a lower cylindrical portion and an upper cylindrical portion of greater diameter than the lower cylindrical portion defining a shoulder between the juncture of said upper cylindrical portion and said lower cylindrical portion, a piston having a rod portion, said rod portion having constant diameter positioned in the bore and having a flange with a bearing engaging the lower portion of the bore,
an annular retainer engaging said shoulder,
an annular end cap being threaded into said upper portion of said bore and engaging said retainer, and
an annular lock nut threaded into the upper portion of said bore and engaging said end cap,
sealing means between the inner surface of the upper portion of the bore and the end cap,
openings through the side wall of the cylinder at a point spaced upwardly and extending outwardly from said sealing means for venting the pressure within the cylinder.

2. The gas spring set forth in claim 1 including a stepped opening in said base wall and a rupture plug in said base wall for venting pressure when the pressure exceeds a predetermined amount.

3. The gas spring set forth in claim 1 including a stepped opening in said base wall and a charging valve in said base wall.

4. The gas spring set forth in claim 1 including a cup seal held by said end cap in contact with said retainer.

5. The gas spring set forth in claim 1 including a wiper seal retained by said lock nut in engagement with said rod portion of said piston.

6. The gas spring set forth in claim 1 including a radial opening in said base wall for selectively receiving either a plug to provide a self-contained gas spring or a fitting for connecting a plurality of gas spring in series or to an external manifold.

7. The as spring set forth in claim 6 including a plug in said radial opening thereby providing a self-contained gas spring.

8. The gas spring set forth in claim 6 including a fitting in said opening for connecting a plurality of gas springs in series or to an external manifold.

* * * * *